(12) United States Patent
Fidanza

(10) Patent No.: US 8,836,541 B2
(45) Date of Patent: Sep. 16, 2014

(54) ROTORCRAFT HAVING LIGHTING EQUIPMENT WITH A PLURALITY OF HEADLIGHTS OPERATED FOR LANDING, WINCHING, AND SEARCHING

(75) Inventor: Raphaël Fidanza, Marseilles (FR)

(73) Assignee: Airbus Helicopters, Marignane Cedex (FR)

( * ) Notice: Subject to any disclaimer, the term of this patent is extended or adjusted under 35 U.S.C. 154(b) by 146 days.

(21) Appl. No.: 13/553,114

(22) Filed: Jul. 19, 2012

(65) Prior Publication Data

US 2013/0182449 A1    Jul. 18, 2013

(30) Foreign Application Priority Data

Jul. 29, 2011 (FR) ........................ 11 02395

(51) Int. Cl.
*G08B 21/00* (2006.01)
*B64D 47/04* (2006.01)

(52) U.S. Cl.
CPC ..................... *B64D 47/04* (2013.01)
USPC ............................ 340/946; 340/971; 340/984

(58) Field of Classification Search
USPC ......... 340/946–950, 951–952, 956, 959–963, 340/964, 967, 971–973, 980–987, 994
See application file for complete search history.

(56) References Cited

U.S. PATENT DOCUMENTS

| 3,634,622 | A | 1/1972 | Wheeler | |
|---|---|---|---|---|
| 4,115,841 | A | 9/1978 | Alexander | |
| 5,589,901 | A | 12/1996 | Means | |
| 6,315,435 | B1 * | 11/2001 | Hamilton et al. | 362/476 |
| 6,962,423 | B2 | 11/2005 | Hamilton | |
| 2001/0026452 | A1 | 10/2001 | Ganzer | |
| 2003/0086251 | A1 | 5/2003 | Hamilton | |
| 2009/0166468 | A1 * | 7/2009 | Ryan et al. | 244/1 A |
| 2011/0196540 | A1 * | 8/2011 | Engelhardt | 700/278 |
| 2012/0176808 | A1 * | 7/2012 | Rust | 362/470 |

FOREIGN PATENT DOCUMENTS

| EP | 1138593 A1 | 10/2001 |
|---|---|---|
| EP | 1683720 A2 | 7/2006 |
| WO | 0049331 A2 | 8/2000 |
| WO | 03039957 A1 | 5/2003 |

OTHER PUBLICATIONS

Search Report and Written Opinion; Application No. FR 1102395; dated Feb. 24, 2012.

* cited by examiner

*Primary Examiner* — Daniel Previl
(74) *Attorney, Agent, or Firm* — Brooks Kushman P.C.

(57) ABSTRACT

A rotorcraft (1) having on-board lighting equipment for lighting the surrounding environment. The lighting equipment comprises a plurality of headlights (2, 2', 3, 3') that are allocated to respective specific lighting functions in landing and in winching. The headlights (2, 2', 3, 3') are also operated to perform a searching lighting function. Control means determine which headlights (2, 2', 3, 3') are to be operated depending on a lighting function selected by an operator and depending on where the headlights are located on the rotorcraft (1). A search zone (4, 4') for illuminating is identified by identification means on the basis of a lighting command common to the headlights (2, 2', 3, 3'). Coordination means cause the headlights (2, 2', 3, 3') to converge on the identified search zone (4, 4'), while taking account of their respective locations on the rotorcraft (1).

20 Claims, 2 Drawing Sheets

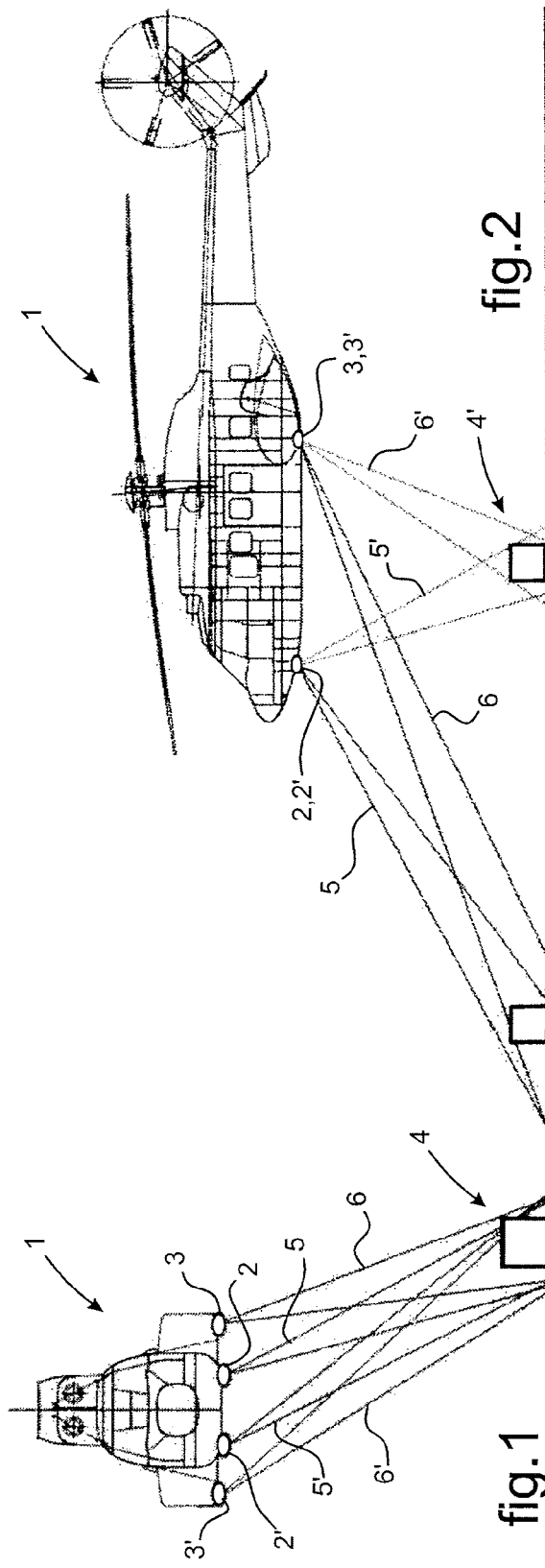
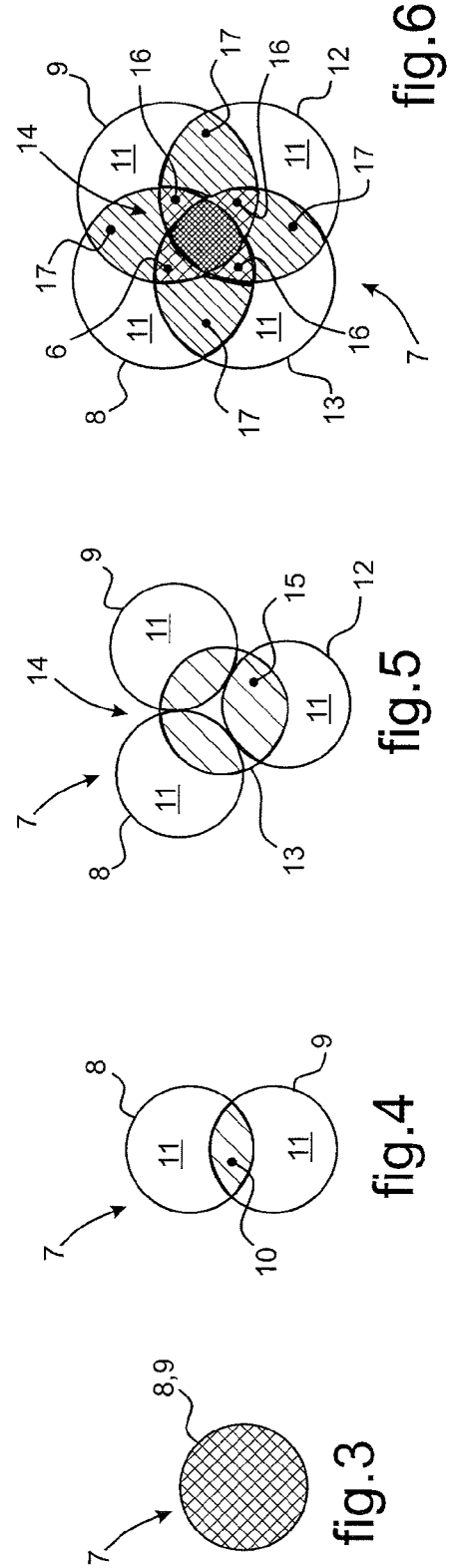

ROTORCRAFT HAVING LIGHTING EQUIPMENT WITH A PLURALITY OF HEADLIGHTS OPERATED FOR LANDING, WINCHING, AND SEARCHING

CROSS REFERENCE TO RELATED APPLICATIONS

The present application claims priority to French patent application FR 11 02395 filed on Jul. 29, 2011, the content of which is incorporated in its entirety by reference herein.

BACKGROUND OF THE INVENTION (1) Field of the Invention

The present invention relates to the field of rotorcraft, and more particularly it relates to equipment on board rotorcraft for lighting the surrounding environment.

The present invention provides a rotorcraft having such equipment, comprising a plurality of devices for lighting respective zones for illumination that are remote from the rotorcraft. The present invention also provides such rotorcraft lighting equipment, and a method of operating it.

(2) Description of Related Art

Rotorcraft are fitted with various on-board devices for lighting the surrounding environment. In general terms, such lighting devices make use of one or more headlights, and of means for controlling the emission of a light beam by means of the or each headlight. The control means are suitable for being activated by an operator on board the rotorcraft, a pilot or a copilot, in particular. Activation of the control means by the operator depends on a control member operated by a human.

The organization and the positioning of headlights on the rotorcraft vary depending on constraints that are specific to the functions of the lighting devices. It is necessary to find a compromise between optimizing the function to which a lighting device is dedicated and the constraints that are associated with organizing and installing one or more headlights on the rotorcraft that are operated in order to perform the function. As an illustration, reference is made to a non-limiting list of types of lighting device that may be found on board rotorcraft, enabling a remote zone for illumination to be lighted, depending on the specific functions of the devices:

Landing lighting devices perform a function whereby the zone to be illuminated is a zone on which it is intended to land the rotorcraft. Landing lighting devices are for providing moderate lighting of a predetermined zone on the ground during an approach flight stage of the rotorcraft.

Searching lighting devices relate to an operator on board the rotorcraft observing the surrounding environment. Searching lighting devices are designed to light with strong illumination zones that may be relatively arbitrary and far away from the rotorcraft.

Winching lighting devices are designed to provide moderate lighting of a zone for illuminating that has previously been identified by the pilot using the searching lighting device. The zone for illuminating is larger than a zone for illuminating while landing, in order to make it possible to take action on the identified zone.

Amongst the constraints relating to organizing lighting devices, it is desirable for the cost of obtaining them to be as low as possible. The total weight of the set of headlights fitted to the rotorcraft must also be kept as small as possible. It is appropriate to limit the number of headlights fitted to the rotorcraft without diminishing the desired lighting functions. The equipment included individually in each of the headlights installed on the rotorcraft must be limited and of structure that is as simple as possible, without that impeding the operation of the various lighting devices with which they are respectively associated.

The arrangement and positioning of the headlights on the rotorcraft must be organized so as to avoid them generating drag to the detriment of the aerodynamic performance of the rotorcraft. It is thus common practice to mount a headlight retractably on a rotorcraft so as to enable it to be refracted while it is not in use, and/or to install a headlight on a rotorcraft in a zone that limits its wind resistance.

It is desirable to optimize the space available on the rotorcraft for installing equipment other than lighting devices. The location on the rotorcraft and the size of the headlights together with their equipment need to take account of optimizing available space. It is also necessary for the locations of the headlights on the rotorcraft and the ways in which they are installed to avoid interposed masks, i.e. obstacles to the passage of the light beams from the headlights to the remote zone that is to be illuminated.

The outside wall of the rotorcraft is formed by a skin that is fragile and needs to be protected. The power of the headlight is a determining factor in obtaining lighting of satisfactory brightness for the zone to be illuminated, depending on the function required of the lighting device. The lighting power of a headlight leads to it heating up, so that a compromise needs to be found between the power of the light beam that it emits and the effect of the heat that is given off on the skin of the rotorcraft. The thermal power of the headlight should be as small as possible and the location of the headlight and/or the way it is installed should avoid causing the outside wall of the rotorcraft to be heated.

Mounting the headlight movably on the rotorcraft obtains the advantage of making it retractable, or indeed of enabling it to be steered so as to point the light beam that it emits to almost any remote zone for illuminating. The movements of the headlight are preferably dependent on control means so as to enable the operator to point it as required. The control member is associated with control means formed by at least one computer for managing the operation of the headlight, both with regard to emitting the light beam that it emits and with regard to how it is pointed.

Landing lighting devices comprise one or more headlights that conventionally present moderate power, of about 250 watts (W). A headlight is mounted stationary on the rotorcraft and it is optionally accompanied by another headlight that is mounted to be movable. Winching lighting devices comprise a plurality of independent headlights, commonly two of them, and each of them conventionally has medium power of the order of 600 W. The headlights for winching lighting devices are preferably individually mounted to be movable on the rotorcraft so as to enable the pilot to point each of the respective light beams they emit in independent manner. Given their functions, there is limited freedom in selecting locations on the rotorcraft for the headlights making up lighting devices that are dedicated to landing and/or to winching. The overall size of the headlights should be limited as much as possible in order to make them easier to install on the rotorcraft, while avoiding the thermal effects they induce, and not impeding the installation of other pieces of equipment.

Lighting devices for searching are more complex and bulky than lighting devices dedicated to landing and winching. The searchlights need to light the zone for illuminating with light of strong intensity, by using powerful headlights that give rise to considerable heating. The lighting devices used for searching comprise one or more searchlights that are conventionally carried together by a frame. The searchlights are individually mounted on the frame via respective supports belonging to each of them. The frame and/or the support are potentially large with considerable bulk, e.g. being mounted on a mast, or the like. The frame is commonly mounted to be extractable from the rotorcraft, so as to limit the drawbacks associated with its considerable bulk and so as to avoid harmful wind resistance of the searchlights while the searching lighting device is not being used. Given that the locations of the zones for illuminating are potentially relatively arbitrary, the searchlights may easily be placed in temporary manner on the rotorcraft, while avoiding possible masking that might impede the passage of the light beams towards the zone for illuminating. Extending the frame and/or the support procures the advantage of moving the searchlight(s) away from the outside wall of the rotorcraft, thereby avoiding heating it as a result of the considerable power of each of the searchlights, which power is of the order of 1600 W. When a plurality of searchlights are mounted on the support, the searchlights are mounted to move together so as to enable them to be pointed together towards the zone for illuminating, while restricting their individual power levels, even though together they provide considerable illumination of the remote zone to be lighted.

For information about a technological environment that is close to that of the present invention, reference may be made for example to the documents WO 00/49331 (Allied Signal Inc.) and WO 03/039957 (Honeywell Int. Inc.), which describe searchlights on board rotorcraft that are dedicated to lighting a zone for illumination that is remote from the rotorcraft. Operation of those searchlights depends on control means that are dedicated to managing their operation.

Reference may also be made to document EP 1 138 593 (Hella KG Hueck & Co.), which describes a headlight including a landing lighting device. The headlight is mounted stationary on the aircraft and it is fitted with a gas discharge lamp and a plurality of optical systems. The optical systems are mounted to move together inside the headlight, so as to emit respective light beams that make it possible to illuminate the zone for illuminating in an overlapping configuration with sufficient light intensity, while limiting the thermal effects produced by the headlight.

Reference may also be made to the following documents: U.S. Pat. No. 3,634,622 (Wheeler B. A.); WO 00/49331 (Allied Signal Inc.); and U.S. Pat. No. 5,589,901 (Means K. P.), which describe various searching lighting devices having at least one searchlight movably mounted on a rotorcraft.

According to document U.S. Pat. No. 3,634,622 (Wheeler B. A.), a searching lighting device has two searchlights mounted to be individually movable on a rotorcraft. The searchlights may be steered to converge on a zone for illuminating that is remote from the rotorcraft.

According to document WO 00/49331 (Allied Signal, Inc.), a searchlight is movably mounted with motor drive on a rotorcraft to be movable about two intersecting axes, respectively in azimuth and in elevation relative to the rotorcraft. The searchlight is tiltable between a retracted position inside a housing formed in the wall of the rotorcraft, and a deployed position outside the housing. The searchlight when tilted into the deployed position is also steerable to pivot in turning.

According to document U.S. Pat. No. 5,589,901 (Means K. P.), a pair of searchlights are movable by using motorized means under the control of control means that can be activated by a human.

The ways in which lighting equipment of a rotorcraft are organized need to be improved, given the variety of potential functions involved when lighting a zone for illuminating that is remote from the rotorcraft.

BRIEF SUMMARY OF THE INVENTION

The object of the present invention is to propose a rotorcraft fitted with various lighting means that individually provide specific functions for lighting a remote zone for illuminating. The various lighting functions are in particular and in non-limiting manner, a landing lighting function, a searching lighting function, and a winching lighting function. The present invention also provides lighting equipment organized for fitting to a rotorcraft, and a method of operating such equipment. The present invention seeks more particularly to fit a rotorcraft with a lighting architecture for lighting its surrounding environment, including a variety of lighting devices that perform specific lighting functions while taking account of the various constraints as mentioned above.

The present invention provides a rotorcraft having on-board equipment for lighting the surrounding environment. The lighting equipment comprises a plurality of devices for lighting specific zones for illuminating that are remote from the rotorcraft, which devices are operated individually by a pilot using control means placed under the control of at least one control member operated by a human. The lighting devices of the rotorcraft on which they are mounted comprise in particular at least a landing lighting device, a searching lighting device, and a winching lighting device.

Each of the lighting devices comprises at least one headlight, comprising a unit housing a lighting module having an optical system and a source of light. Each of the lighting devices also includes control means for controlling the emission of a light beam by the headlight.

A rotorcraft headlight is a lighting apparatus comprising a unit that is closed by a transparent wall through which one or more light beams emerge. The unit houses at least one lighting module, mainly comprising a light source and an optical system suitable for modifying at least one parameter of the light generated by the light source in order to enable the lighting module to emit a light beam.

By way of example, the light source may be constituted by a gas lamp, a set of light-emitting diodes (LEDs), or any other member suitable for emitting light.

The optical system has optical components, e.g. constituted by a reflector, a lens, a diffusing element or a collimator, or indeed any other member suitable for modifying at least one of the parameters of the light generated by the light source, such as its mean reflection and/or its pointing direction. The optical system may also include means for adjusting the focal length of the headlight, which means are suitable for being operated by the control means.

The headlight is fitted with power supply means for taking electricity from the on-board network of the rotorcraft, in particular. The emission of a light beam by the headlight is under the control of means for selectively activating its light source. The light source activation means are operated under the control of control means, serving to power the light source selectively on the basis of a command that is generated by a control member operated by a human. The light source is in particular connected to the on-board network of the rotorcraft in order to be powered.

The unit that includes the headlight is advantageously arranged for installing on a rotorcraft, in particular by integrating the headlight unit in the outside wall of the rotorcraft.

The control means are in particular calculation means associated with memory means incorporated in at least one computer. The calculation means generate control orders from at least one lighting command issued by a control member operated by a human. Control orders are suitable for actuating an actuator for moving the headlight unit, and/or for activating the light source of the headlight, and/or, optionally, for acting on the optical system of the headlight, e.g. in order to vary its focal length.

The present invention relates essentially to organizing the searching lighting device of the lighting equipment fitted to the rotorcraft. Such a searching lighting device comprises in particular at least one searchlight that is movably mounted on the rotorcraft and that is fitted with drive means for driving it in azimuth and in elevation relative to the rotorcraft. The drive means are operated by search control means from a search lighting command to light search zone that is to be illuminated. The search lighting command is generated by at least one search control member operated by a human.

The inventive step of the present invention is based on a restriction of the number of headlights mounted on the rotorcraft, so as to obtain all of the desired lighting functions. Such a restriction is selected by making use in the searching lighting function of headlights that are also used for other lighting functions, and in particular for landing lighting and for winching lighting.

More particularly, the searchlights used by the searching lighting device comprise at least two headlights used by the over lighting device included in the lighting equipment. The said headlights included in at least any one of the other lighting devices include in the lighting equipment on board the rotorcraft. The headlights of the lighting equipment are distributed over the rotorcraft in at least two lighting functions that are specific to said other lighting devices, a landing lighting device and a winching lighting device, in particular. The searching lighting function is obtained by applying a search lighting command common to all of the headlights, on the basis of selective activation by the control means of the headlights making up the lighting equipment. The searching lighting device don't use specific searchlights, but include headlights used for at least two lighting functions, one for a specific lighting function as for example landing lighting function or winching lighting function, and another one for searching lighting function.

The headlights included in the lighting equipment are allocated to a plurality of lighting functions, including a lighting function that is specific thereto and a searching lighting function that makes use of the headlights implemented by the other specific lighting functions. The headlights included in the lighting equipment are installed on the rotorcraft and they are individually organized, in particular in terms of electrical power, depending on their respective specific lighting functions, and in particular a landing lighting function and a winching lighting function. The headlights making up the lighting equipment are operated selectively for the searching lighting function.

The control means include function means relating to selectively using different lighting devices included in the lighting equipment. The function means enable an operator to select a lighting function that is to be used amongst the various lighting functions that are made available by the lighting equipment of the rotorcraft. The use of the function means is placed under the control of a lighting function command that is generated by a human-operated lighting function control member that may be organized as a multiple-choice control member or the like. On the basis of a corresponding lighting function command, the function means cause headlights included in the lighting equipment to be used either in application of a predetermined function rule depending on that one of the specific lighting functions to which they are allocated, or else in application of a search function rule corresponding to the searching lighting function. The search lighting rule is managed by the control means depending on the location where the headlights included in the lighting equipment are installed on the rotorcraft, and more particularly it is managed by coordination means included in the control means for coordinating the use of the headlights used for searching lighting function.

The search lighting command requires an operator, the pilot or some other operator on board the rotorcraft, to locate the search zone to be illuminated simultaneously by the headlights. The search lighting command is common to all of the headlights used for searching lighting function, and corresponds to Cartesian reference coordinates relating to the zone for illuminating in its location identified by the operator relative to the rotorcraft. Such Cartesian reference coordinates may be generated by operating a control member arranged as a stick or the like and fitted to the rotorcraft, such as a stick that can be moved in multiple directions and that is advantageously provided with means for installing it in the armrest of a seat. By way of example, the stick may be mounted to move about two intersecting tilt axes that are respectively associated with the operator requesting that the headlights used for searching lighting function be driven in elevation or in azimuth relative to the rotorcraft.

Since there are a plurality of headlights that are spaced apart from one another, the illumination of the search zone by the set of headlights requires the light beams emitted by the respective headlights to be caused to converge on the search zone. Such convergence is obtained by coordination means included in the control means and serving to coordinate the individual use of the headlights. In particular, the coordination means comprise calculation means for weighting the Cartesian reference coordinates as a function of predefined parameters relating to the individual locations of the headlights on the rotorcraft. The coordination means act for each of the headlights used for searching lighting function to correct the Cartesian reference coordinates on the basis of weighting parameters that correspond to the respective locations on the rotorcraft of each of the headlights. The coordination means generate individual drive orders for causing the headlights used for searching lighting function to move relative to the rotorcraft on the basis of a lighting command that is common to all of the headlights. For a given search zone to be illuminated, the headlights used for searching lighting function are driven simultaneously by the coordination means to point in respective orientations for illuminating the search zone so as to cause the respective light beams they emit to converge thereon. The headlights used for searching lighting function are driven towards the individual illuminating orientations that are allocated to them respectively by drive orders that are specific to each of the headlights and that are generated by the coordination means, after correcting the Cartesian reference coordinates.

The headlights constituting the searchlights are made up of headlights used by the landing lighting device and/or by the winching lighting device, without it being necessary to use a searchlight that is operated specifically for and/or reserved to implementing the searching lighting device. The headlights making up the searchlights may be constituted by at least one of the headlights in each of at least two lighting devices included in the lighting equipment, and more particularly the landing lighting device and the winching lighting device, which headlights are used together for the search lighting function. The headlights making up the searchlights may also include a plurality of headlights included in at least any one of each of the lighting devices forming part of the lighting equipment. Ideally, and in order to optimize the illumination and/or the extent of the search zone to be lighted, all of the headlights of the landing lighting device and of the winching lighting device are used to form the searchlights.

The headlights included in the lighting equipment with which the rotorcraft is fitted are suitable for being incorporated relatively freely in the outside wall of the rotorcraft, while selectively producing a plurality of lighting functions, in particular the landing lighting function, the searching lighting function, and/or the winching lighting function. Whatever the function selected by an on-board operator, a pilot or copilot in particular, the headlights individually mounted on the rotorcraft at selected locations on its outside wall may be analogous mechanical structures making them easier to install and reducing the cost of obtaining lighting equipment. Incorporating and installing headlights in the outside wall of the rotorcraft leads to a searching light function that is effective, while making use only of headlights of other searching devices that are included in the lighting equipment fitted to the rotorcraft. The number of headlights potentially usable for searchlights by an on-board operator is optimized without leading to redundancy among the headlights that need to be installed on the rotorcraft in order to obtain all of the lighting functions that are available to the operator.

The drag effects that could be induced by the headlights used for searching lighting function while they are not in use are avoided, without it being necessary to intervene concerning their permanent installation on the rotorcraft. The consequences that arise as a result of possible masks constituting obstacles to the passage of the light beams emitted by the headlights towards the search zone for illuminating are limited. The facility made available by remote installation on the rotorcraft of a plurality of headlights, each of moderate individual power, does not impede convergence of the light beams that the respective headlights emit.

The heat power generated by each of the headlights may be reduced, while nevertheless obtaining optimized lighting of the search zone for illuminating, selectively both in terms of brightness and in terms of the area of the illuminated search zone that is covered. The individual thermal powers of the headlights come in particular within the range of thermal powers currently in use for landing lighting devices and winching lighting devices, possibly with a small increase depending on the specific architecture of the rotorcraft and/or on the individual and remote location of each headlight in the outer wall of the rotorcraft.

More particularly, the search control means comprise identification means for identifying a search zone for illuminating on the basis of a search lighting command that is common to all of the headlights. The search zone is identified relative to a frame of reference that is determined relative to an origin point located on the rotorcraft, and relative to the respective positions on the rotorcraft of the headlights in that frame of reference. Still more particularly, the search control means include the coordination means for individually operating the headlights used for searching lighting function. The coordination means cause the light beams that are emitted respectively by the headlights used for searching lighting function having their respective light sources selectively activated to converge on the search zone.

In particular, the coordination means generate selective activation orders for selectively activating the light sources of the headlights used for searching lighting function, and individual drive orders for driving these headlights towards the search zone. The individual drive orders cause the drive means fitted respectively to the headlights to be activated individually so as to cause the light beams respectively emitted by the headlights having their respective light sources selectively activated to converge on the search zone.

In an advantageous embodiment, the coordination means generate additional lighting orders to improve the illumination of the search zone. Such additional lighting orders may be used without making the structure of the installation of the headlights on the rotorcraft structurally more complex. For example, the additional lighting orders comprise, in isolation or in combination:

Individual orders for focusing the headlights, which orders are derived from a focusing lighting command that may be generated equally well by a human-operated focusing control member or by measurement means for measuring the distance separating the rotorcraft from the search zone. The measuring means are appropriate means on board the rotorcraft, such as a radio altimeter or analogous means for measuring a distance between the rotorcraft and the ground. The measurement means may take the place of or provide reduced-authority assistance to the focusing control member. The focusing orders relate in particular to the individual distances between each headlight and the search zone, and they may serve to activate respective actuators of the optical systems of the headlights in order to modify their focal lengths. The focusing orders give rise in particular to actuators being operated to adjust at least one optical system included respectively in each of the headlights so as to modify its focal length.

In an improved embodiment, each of the headlights may have a plurality of lighting modules. The individual actuations of the light sources included in the various lighting modules fitted to a single headlight may depend on the coordination means. Each of the headlights is suitable for emitting a light beam of light intensity that varies depending on the number of light sources it includes that have been selectively activated by the coordination means generating individual activation orders for the light sources included in a given headlight. The coordination means may also be suitable for responding to a given lighting control order to generate individual activation orders for activating actuators that adjust the optical systems of various lighting modules included in a single headlight.

Lighting sweep orders that relate to individually driving the headlights used for searching lighting function, to convergence on the search zone, selectively either on a fixed point or else continuously driving the lighting to sweep a moving search zone defined relative to the frame of reference. The moving nature of the search zone requires the headlights used for searching lighting function to move continuously between two limit positions, the search zone being identified between at least two limit search zones that are defined relative to the frame of reference by the identification means. The lighting sweep orders are in particular derived from a sweep lighting command generated by a lighting sweep control member operated by a human. The lighting sweep orders may include sweep speed orders for the moving search zone, which speed orders are generated by the coordination means.

The sweep speed orders are delivered in particular from a sweep speed lighting command that is generated by a sweep speed control member that is operated by a human and that is fitted to the lighting sweep control member. The lighting sweep control member preferably includes adjustment means that are operated by a human and that enable the operator to adjust parameters relating to continuously driving the headlights used for searching lighting function, and in particular relating to their sweep speeds.

Convergence orders relating to driving the headlights used for searching lighting function to cause the projections on the search zone of the light beams respectively emitted by the headlights selectively to overlap either fully or partially. The convergence orders are in particular derived from a convergence lighting command generated by a convergence control member operated by a human. Causing the light beams individually emitted by the headlights to converge corresponds in particular to causing the respective projections of the light beams to overlap on the search zone. The projections are caused to overlap in particular by the coordination means applying selective criteria relating to a combination desired by the operator, being the intensity with which the search zone is illuminated and the illuminated area of the search zone.

More particularly, by selecting to cause the projections of the light beams on the search zone to overlap in full or partially, the illuminated area of the search zone may be smaller or larger for a corresponding intensity of illumination that is larger or smaller.

The convergence control member may be fitted with an overlap control member operated by a human, which member generates overlap commands relating to the number and to the extent of the overlap zones for a given search zone. Starting from an issued overlap command, the control means determine the group(s) of headlights to be used in order to produce the desired shapes for the overlap zones on the basis of a convergence order.

Zone orders relating to driving the headlights used for searching lighting function selectively towards a plurality of search zones that are respectively allocated thereto. The zone orders are derived from a zone lighting command, which is generated by a zone control member operated by a human.

The present invention also provides on-board lighting equipment for a rotorcraft, for the purpose of lighting a zone for illumination that is remote from the equipment. The organization of the lighting equipment is adapted to being installed on a rotorcraft as described above.

On-board lighting equipment for a rotorcraft comprises a plurality of headlights, each comprising a unit housing a light source and an optical system.

In particular for a headlight, the unit is fitted with movable mounting means on a housing and with drive means about at least two intersecting movement axes. The lighting equipment has control means for controlling the emission of light beams by the headlights, and at least one control member operated by a human to generate a lighting command on the basis of which the control means are operated.

The control means of the lighting equipment incorporate identification means for identifying a zone for illuminating on the basis of a lighting command common to all of the headlights and generated by a corresponding control member operated by the human. The zone for illuminating corresponds to a search zone that is remote from the equipment relative to a frame of reference previously defined relative to an origin point under consideration.

The control means also include coordination means for individually operating the headlights, so as to cause the light beams respectively emitted by the headlights used for searching lighting function having their respective light sources selectively activated to converge on the search zone.

The lighting equipment advantageously includes control apparatus including a multiple-choice control member forming the lighting function control member that generates the lighting function command. The lighting function command relates to selectively operating a specific function of the lighting equipment selected from among a plurality of predefined lighting functions.

The lighting functions include in particular at least a landing lighting function, a searching lighting function, and a winching lighting function. The multiple-choice control member enables the operator to select a lighting function to be implemented by the headlights included in the lighting equipment. The headlights may be operated in alternation for a plurality of lighting functions, in particular for at least one searching lighting function and for at least one of the other lighting functions provided by the lighting equipment, and in particular the landing lighting function and the winching lighting function. The multiple-choice control member is a control member that causes one or more of the headlights in the set of headlights included in the lighting equipment to be operated selectively. Such selective operation of the headlights is governed by the control means as a function of a lighting function command that has been generated depending on the lighting function selected by the operator using the multiple-choice control member, and serving to determine which headlight(s) to operate.

The control apparatus comprises a main control member for generating a lighting command that is common to all of the headlights used for searching lighting function. The lighting command relates to a location of a search zone relative to the origin point of the frame of reference. The main control member is in communication with said identification means to which it transmits the lighting command.

The main control member is advantageously arranged as a stick hinged to move in multidirectional manner, such as a control stick or lever implantable in the armrest of a seat. Such a stick is easily optionally fitted with at least a said focusing control member, a said lighting sweep control member, a said convergence control member, a said zone control member, and the multiple-choice control member. The stick forming the main control member is suitable for easily receiving the additional control members, which are for example organized as control buttons or the like. Such a button may be arranged as a slider, as a multidirectional hat button, or indeed as a multiple-choice control member. The stick and the optional additional control members with which it may be fitted can be operated comfortably by an operator using one hand.

The individual directions in which the headlights may be moved correspond to moving the headlights about respective intersecting axes, so as to point each of them in azimuth or in elevation. Being movable in such directions makes it possible for the headlights to be moved omnidirectionally together in three-dimensional space. In an advantageous embodiment serving to limit the individual size of the headlights and making them easier to install on the outside wall of a rotorcraft, the drive means fitted individually to each of the headlights comprise:

the housing that is fitted with turning drive means for turning about a turning axis corresponding to a first direction of movement of the headlight, in particular for pointing the headlight in azimuth; and a support for the headlight that is fitted with pivot drive means for pivoting relative to the housing about a pivot axis intersecting the turn axis and corresponding to a second direction of movement of the headlight, in particular for pointing the headlight in elevation.

The drive means for pivoting the support advantageously constitute means for retracting the headlight inside the housing, which housing is arranged as a container for housing the support. The refraction means are means for moving the headlight between a retracted position in which the headlight is housed inside the container formed by the housing, and a deployed position in which the headlight emerges at least in part out from the container formed by the housing. In the refracted position, the headlight is suitable for being used for a landing lighting function or indeed for a winching lighting function.

In the deployed position, the headlight is suitable for being used for a searching lighting function, or for a winching lighting function. Operation of the means for driving tilting of the support is advantageously placed under the control of a lighting function command that generates a refraction command order by the control means.

The refraction command order causes a headlight or a group of headlights that have previously been selected for operation by the control means to be driven by a corresponding functional lighting command that has been generated. Such drive causes a headlight or a group of headlights to go between the retracted position and the deployed position, or vice versa, depending on the lighting function command selected by the operator by means of the multiple-choice control member.

The present invention also provides a method of implementing lighting equipment on board a rotorcraft, as described above. Such a method is adapted to enabling a rotorcraft fitted with lighting equipment as described above to be used for missions during which zones for illuminating that are remote from the rotorcraft might need to be lighted using various lighting functions, landing lighting, searching lighting, and winching lighting, in particular.

In general terms, such a lighting method is recognizable mainly in that it comprises:

An initial step of issuing a said lighting function command to the control means on the basis of an operator operating a said lighting function control. The lighting function command relates to selecting one of the functions of the lighting equipment that is to be used from among a plurality of predefined lighting functions, including in particular at least a landing lighting function, a searching lighting function, and a winching lighting function. Depending on which lighting function has been selected, the control means determine which headlight(s) to activate depending on the locations of the headlights on the rotorcraft as determined by the specific lighting functions to which the headlights are allocated.

A step of the control means selectively activating a light source of at least one of the headlights operated for the lighting function selected on the basis of the lighting function control. Such a selected lighting operation may be associated with a retraction control order that causes the headlight(s) for which the respective light source(s) is/have been selectively activated to be moved into the deployed position.

Where appropriate, if the selected lighting function is a searching lighting function:

a) a step of the identification means identifying a said search zone on the basis of the operator operating the main control member issuing a lighting command; and b) a step of individually driving the headlights having their respective light sources activated, so as to cause the light beams that the headlights emit respectively to converge on the previously-identified search zone.

Preferably, the method comprises at least one control step derived from the operator operating a corresponding additional control member, selected from control steps generating control orders comprising said focusing orders, said lighting sweep orders, said convergence orders, and said zone orders.

When control step comprises generating convergence orders, the individual drives of the headlights used for searching lighting function under the control of the coordination means cause the projections of the respective light beams emitted by a group of headlights having their respective light sources activated by the coordination means to converge on at least one search zone. The search zone corresponds to the zone for illuminating that is remote from the lighting equipment. The projections of the light beams are advantageously caused to converge in any one of the following overlap patterns for said projections:

Total overlap of all of the projections. The search zone is covered at least in part if not completely by all of the projections together, with illumination optimized for a search zone of small surface area.

Partial overlap between at least two projections. The search zone is covered at least in part if not completely by partially overlapping projections and by individual remainders of each of the projections that are situated in the periphery of the partial overlap. The search zone is strongly illuminated over a small surface area, and is weakly illuminated at the periphery of the partial overlap. The overall extent of the illuminated search zone is optimized.

A plurality of partial overlaps between at least three projections. The search zone is covered at least in part if not completely by a partial overlap common to at least two or three of the projections, by at least one secondary partial overlap common to at least two projections taken in pairs, and by the individual remainders of each of the projections that are situated at the periphery of the secondary partial overlap. The total extent of the search zone is optimized by being strongly illuminated over a small area corresponding to the common partial overlap, well illuminated over a moderate surface area corresponding to at least one secondary partial overlap, and weakly illuminated by the individual remainders of each of the projections at least at the periphery of the secondary partial overlap.

The option made available by causing the projections of the light beams respectively emitted by the headlights to overlap on the search zone is used more particularly for a searching lighting function. Such lighting in which projections are caused to overlap on the search zone may also advantageously be used in order to light a landing zone and/or a winching zone.

BRIEF DESCRIPTION OF THE SEVERAL VIEWS OF THE DRAWINGS

Embodiments of the present invention are described with reference to the figures of the accompanying sheets, in which:

FIGS. 1 and 2 are respectively a face view and a side view of a rotorcraft provided with lighting equipment of the present invention;

FIGS. 3 to 6 are diagrams showing various ways in which the lighting equipment fitted to the rotorcraft shown in FIGS. 1 and 2 can be implemented;

DETAILED DESCRIPTION OF THE INVENTION

Figure 7:
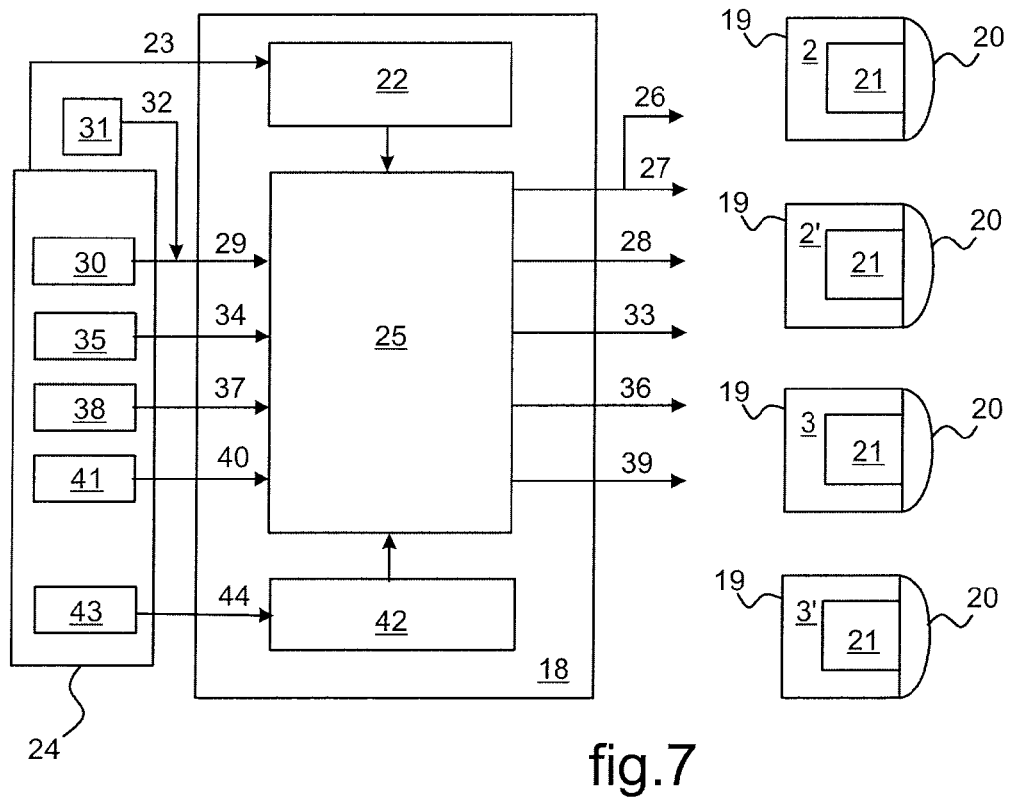
FIG. 7 is a diagram showing control means included in the lighting equipment fitted to the rotorcraft shown in FIGS. 1 and 2.

In FIGS. 1 and 2, a rotorcraft 1 has on-board lighting equipment in order to light the surrounding environment, and more particularly one or more zones that are remote from the rotorcraft. The lighting equipment is organized to produce a plurality of lighting functions, including a landing lighting function, a searching lighting function, and a winching lighting function. All of these lighting functions are obtained by a set of headlights 2, 2', 3, 3' included in the lighting equipment, including two landing headlights 2, 2' for performing the landing lighting function, and winching headlights 3, 3' for performing the winching lighting function.

The headlights 2, 2', 3, 3' are installed on an outside wall of the rotorcraft 1, being spaced apart from one another, and being four in number in the example rotorcraft shown. Two landing headlights 2, 2' are spaced apart sideways at the front of the rotorcraft 1, and two winching headlights 3, 3' are spaced apart at the rear of the rotorcraft 1. The individual powers of the headlights 2, 2', 3, 3' should be assessed relative to the powers that are conventionally used for the lighting functions with which they are respectively associated, in particular the landing lighting function for the landing headlights 2, 2' and the winching lighting function for the winching headlights 3, 3'.

The searching lighting function is performed by using at least two if not three and preferably four of the headlights 2, 2', 3, 3' in the lighting equipment. In order to illuminate a search zone, two headlights may be used, such as for example one landing headlight 2 and one winching headlight 3. The headlights 2, 2', 3, 3' that are selectively operated for the searching lighting function are determined by control means forming part of the lighting equipment. In the implementations of the searching lighting function shown in FIGS. 1 and 2, the four headlights 2, 2', 3, 3' are used to optimize the lighting and/or the number of search zones 4, 4' for illuminating.

In FIG. 1, all four headlights 2, 2', 3, 3' are used, all pointing towards the same search zone 4 that is to be illuminated, so that the respective light beams 5, 5', 6, 6' emitted by the headlights converge thereon.

In FIG. 2, the four headlights 2, 2', 3, 3' are arranged in groups of two headlights 2, 3 and 2', 3'. The light beams 5, 6 and 5', 6' emitted by the headlights are pointed at distinct search zones 4, 4' that are respectively associated to them in pairs by the control means. Each set of headlights 2, 2', 3, 3' has one landing light 2, 2' and one winching light 3, 3', but it is possible to make use of various combinations of the headlights 2, 2', 3, 3' for the searching lighting function, depending on the number of search zones 4, 4' and/or on how it is desired to illuminate them.

In FIGS. 3 to 6, a search zone 7 may be illuminated in various ways by a rotorcraft of the present invention.

In FIG. 3, all of the light beams that are emitted individually by the headlights used for searching lighting function, there being at least two of them, converge on the search zone 7. The respective projections 8, 9 of the light beams on the search zone 7 overlap fully. The search zone 7 is strongly illuminated over a small area.

In FIG. 4, two headlights are used to illuminate the search zone 7, the light beams that the headlights emit respectively converging thereon. The projections 8, 9 of the light beams on the search zone 7 overlap partially. The search zone 7 is lighted over a moderately large area, being moderately illuminated in the lighting zone corresponding to the partial overlap 10, and weakly illuminated in the lighting zone corresponding to the remainders 11 of the projections 8, 9.

In FIGS. 5 and 6, four headlights are used to light the search zone 7, with the respective light beams emitted by the headlights converging thereon.

In FIG. 5, the overall area of the search zone 7 covered by the projections 8, 9, 12, 13 of the light beams is optimized, being strongly illuminated in a central zone 14 of moderate extent. The central zone 14 of the search zone 7 is covered by partial overlap 15 of all of the projection 13 of one of the light beams, and of part of each of the projections 8, 9, 12 of the other light beams. At the periphery of the central zone 14, the remainders 11 of the projections 8, 9, 12 of the said other light beams light the search zone 7 with weak illumination over a very large area.

In FIG. 6, all of the respective projections 8, 9, 12, 13 of the light beams onto the search zone 7 partially overlap a central lighting zone 14, which is of small extent and strongly illuminated. At the periphery of this central zone 14, the immediate remainders 16 of the projections 8, 9, 12, 13 of the light beams, taken in threes, light the search zone 7 in an immediate peripheral zone of small extent with strong illumination. At the periphery of the immediate peripheral zone, intermediate remainders 17 of the projections 8, 9, 12, 13 of the light beams, taken in pairs, light the search zone 7 in an intermediate peripheral zone with moderate illumination over an extended area. At the periphery of the intermediate peripheral zone, peripheral remainders 11 of the projections 8, 9, 12, 13 of the light beams act in isolation to light the search zone 7 in a remote peripheral zone with weak illumination over a moderately extended area.

FIG. 7 shows the lighting equipment fitted to the rotorcraft shown in FIGS. 1 and 2, said equipment comprising control means 18 for controlling the way the headlights 2, 2', 3, 3' are used. Each headlight 2, 2', 3, 3' has a respective unit 19 housing a lighting module comprising a light source 20 and an optical system 21. The control means 18 comprise identification means 22 for identifying a search zone to be illuminated on the basis of a search lighting command 23 that is generated by a main control member 24 operated by a human. The identification means 22 are calculation means that identify the search zone to be lighted from the search lighting command 23 as a function of the relative positions of the various headlights 2, 2', 3, 3' as identified in a determined frame of reference R. The search zone is identified relative to the origin point O of the frame of reference R. The respective positions of the various headlights 2, 2', 3, 3' on the rotorcraft are defined relative to the origin point O of the frame of reference R. The control means 18 also include coordination means 25 that cause the headlights 2, 2', 3, 3' to be used individually and selectively, depending on their respective positions relative to the origin point O, and depending on the location of the search zone identified by the identification means 22. The coordination means 25 generate a selective activation order 26 for application to the light sources 20 of the headlights 2, 2', 3, 3' in order to cause at least two of the headlights to emit light beams. The coordination means 25 also generate individual movement drive orders 27 for those headlights 2, 2', 3, 3' having their light sources 20 activated, in order to point them together towards the search zone as a function of their respective positions relative to the origin point O of the frame of reference R. Pointing the headlights 2, 2', 3, 3' together causes the respective light beams emitted by the headlights 2, 2', 3, 3' used for searching lighting function to converge on the identified search zone.

The coordination means 25 include additional calculation means that are operated individually depending on respective additional control members that are operated by a human. The additional control members are advantageously installed on the main control member 24 in order to make them easier for the operator to use with only one hand. For example, the coordination means 25 generate individual focusing orders 28 for the headlights 2, 2', 3, 3' derived from a focusing lighting command 29 generated by a focusing control 30. The focusing lighting command 29 may also be generated by appropriate measurement means 31 fitted to the rotorcraft and suitable for generating information 32 relating to the separation distance between the rotorcraft and the search zone. The focusing orders 28 serve to activate activators for adjusting the focal length of the headlights 2, 2', 3, 3' by acting on the respective optical systems 21 that they include. Also for example, the coordination means 25 generate lighting sweep orders 33 that relate to individually driving the headlights 2, 2', 3, 3' either towards a fixed point, or else to cause lighting to sweep over a moving search zone between two limit orientations of the headlights, which orientations are defined relative to the frame of reference R. The lighting sweep orders 33 come from a sweep lighting command 34 that is generated by a lighting sweep control 35 that is driven by a human. Also by way of example, the coordination means 25 generate convergence orders 36 relating to the ways in which the projections of the light beams emitted by the headlights 2, 2', 3, 3' are to overlap. The convergence orders 36 come from a convergence lighting command 37 that is generated by a convergence control member 38 driven by a human. Also by way of example, the coordination means 25 generate zone orders 39 that relate to the number of search zones to be lighted simultaneously and distinctly. The zone orders 39 come from a zone lighting command 40 that is generated by a zone control member 41 operated by a human.

The control means 18 also include function means 42 that operate the headlights 2, 2', 3, 3' selectively in response to a lighting function command issued by an operator. The headlights 2, 2', 3, 3' are distributed over the rotorcraft among two lighting functions that are respectively specific thereto, a landing lighting function and a winching lighting function. The headlights 2, 2', 3, 3' are operated selectively for the searching lighting function on the basis of lighting orders 23 generated by the control means 18, and more particularly the coordination means 25. The function means 42 themselves come under the control of a multiple-choice control member 43 or the like that is operated by a human and that is advantageously included in the main control member 24. The multiple-choice control member 43 generates a function lighting command 44 that relates to selectively implementing a particular lighting function. The multiple-choice control member 43 is a member enabling an operator to select which lighting function is to be used, from a landing lighting function, a searching lighting function, and a winching lighting function. From a function lighting command 44, the coordination means 25 generate activation orders 26 and drive orders 27 depending on the lighting function previously selected by the operator.

Figure 8:
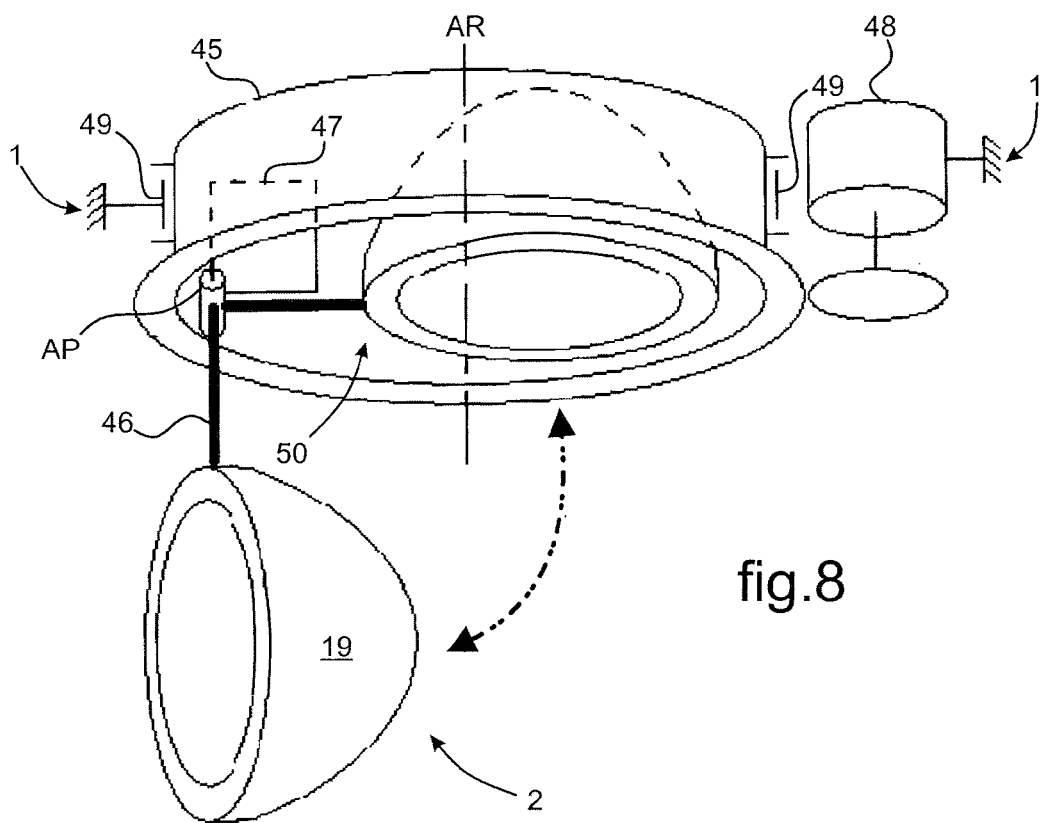
FIG. 8 is a perspective diagram of a search light included in the lighting equipment fitted to the rotorcraft shown in FIGS. 1 and 2.

As shown in FIG. 8, each of the headlights is installed on the outside wall of the rotorcraft to move in multidirectional manner about two intersecting axes. The unit 19 that includes the headlight 2, as shown, is carried by a housing 45 via a support 46 that is arranged as an arm. The support 46 is pivotally mounted on the housing 45 to pivot about a pivot axis AP between a refracted position in which the headlight 2 is inside the housing 45, and a deployed position in which the headlight 2 emerges at least in part from the housing 45. The support 46 is drivable in pivoting about the pivot axis AP using drive means 47 for driving the support 46, thereby enabling the headlight 2 to be pointed in elevation relative to the rotorcraft 1. The housing 45 is mounted to turn about the axis of rotation AR in order to point the headlight 2 in azimuth relative to the rotorcraft 1. The housing 45 is advantageously received in a cavity in the outside wall of the rotorcraft 1, and is fitted with drive means 48 for turning it about the axis of rotation AR. The housing 45 in particular has the shape of a circularly cylindrical tube that is preferably blind, or the like, with its outside wall being guided by rolling members 49 that are interposed between the housing 45 and the outside wall of the rotorcraft 1 that receives it. The hollow inside of the tube forming the housing 45 constitutes a container 50 for housing the headlight 2 in the retracted position. The drive means 47 for turning the housing 45 and the drive means 48 for pivoting the support 46 are constituted in particular by electric rotary actuators that are associated with motion transmission means. Operation of the drive means 47, 48 is under the control of drive orders generated by the coordination means.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A rotorcraft having on-board lighting equipment for lighting the surrounding environment, the lighting equipment comprising a plurality of lighting devices for lighting specific remote zones for illumination, the lighting equipment including at least a landing lighting device and a winching lighting device, each of the lighting devices having at least one headlight comprising a unit housing a lighting module having an optical system and a light source, and control means for controlling the emission of a light beam by the headlights, the headlights from the landing lighting device and winching lighting device forming a group of headlights, the landing lighting device and winching lighting device selectively cooperatively defining a searching lighting system, the searching lighting system comprising at least two searchlights providing a searching lighting function, the at least two searchlights comprising at least two headlights from the group of headlights mounted to move on the rotorcraft and fitted with drive means for driving the searchlight in azimuth and in elevation relative to the rotorcraft, the drive means being operated by search control means from a search lighting command to light a search zone for illumination, which command is generated by at least one search control member operated by a human, the headlights of the landing lighting device and winching lighting device being distributed over the rotorcraft in a landing lighting function and a winching lighting function, the searching lighting function obtained by applying a search lighting command common to all of the headlights, and on the basis of selective activation by the control means of the headlights of the lighting equipment.

2. A rotorcraft according to claim 1, wherein the search control means comprise:
   identification means for responding to the search lighting command common to all of the headlights used for searching lighting function, for identifying a search zone for illuminating relative to a frame of reference (R) determined relative to an origin point (O) located on the rotorcraft and relative to the respective positions on the rotorcraft of the headlights in the frame of reference (R); and
   coordination means for coordinating individual operations of the headlights used for searching lighting function, to cause the light beams emitted by the headlights having their respective light sources selectively activated to converge on the search zone.

3. A rotorcraft according to claim 2, wherein the coordination means generate selective activation orders for selectively activating the light sources of the headlights used for searching lighting function, and individual drive orders for driving these headlights towards the search zone to cause the drive means fitted respectively to the headlights to be activated individually so as to cause the light beams respectively emitted by the headlights having their respective light sources selectively activated to converge on the search zone.

4. A rotorcraft according to claim 2, wherein the coordination means generate individual focusing orders for the headlights, which orders are derived from a focusing lighting command generated either by a human operated focusing control member or by measurement means for measuring the distance separating the rotorcraft from the search zone, the focusing orders relating to individual separation distances between each headlights and the search zone and activate respective actuators of the optical system of the headlights to modify their focal length.

5. A rotorcraft according to claim 2, wherein the coordination means generate lighting sweep orders that relate to individually driving the headlights used for searching lighting function to convergence on the search zone, selectively either on a fixed point or else continuously driving the lighting to sweep a moving search zone defined relative to the frame of reference (R), the lighting sweep orders being derived from a sweep lighting command generated by a lighting sweep control member operated by a human.

6. A rotorcraft according to claim 5, wherein the lighting sweep orders include sweep speed orders for moving the search zone, which orders are generated by the coordination means, being derived from a sweep speed lighting command generated by a sweep speed control member operable by a human and fitted to the lighting sweep control member.

7. A rotorcraft according to claim 2, wherein the coordination means generate convergence orders relating to driving the headlights used for searching lighting function to cause the projections on the search zone of the light beams respectively emitted by the headlights selectively to overlap either fully or partially, the convergence orders being derived from a convergence lighting command generated by a convergence control member operated by a human.

8. A rotorcraft according to claim 2, wherein the coordination means generate zone orders relating to driving the headlights used for searching lighting function selectively towards a plurality of search zones respectively allocated thereto, the zone orders being derived from a zone lighting command generated by a zone control member operated by a human.

9. A rotorcraft with lighting equipment according to claim 2, the lighting equipment comprising a plurality of headlights each comprising a unit housing a light source and an optical system, the unit being fitted with movable mounting means on a housing and with drive means about at least two intersecting movement axes (AP, AR), the lighting equipment having control means for controlling the emission of a light beam by the headlights and at least one control member operated by a human that generates a lighting command from which the control means are operated, wherein:
the control means incorporate identification means responsive to a lighting command common to all of the headlights to identify a zone for illumination that corresponds to a remote search zone relative to a frame of reference (R) previously defined relative to an origin point (O) under consideration, and coordination means for individually operating the headlights to cause the light beams respectively emitted by the headlights having their respective light sources selectively activated to converge on the search zone; and
the lighting equipment includes control apparatus comprising a multiple-choice control member forming a lighting function control that generates a lighting function command relating to selectively operating one of the functions of the lighting equipment selected from among a predefined plurality of lighting functions.

10. Lighting equipment according to claim 9, wherein the multi-choice control member comprises a lighting function control member that generates a lighting function command relating to selectively operating a function of the equipment selected from at least a landing lighting function, a searching lighting function, and a winching lighting function.

11. Lighting equipment according to claim 10, wherein the control apparatus comprises a main control member for generating a lighting command common to all of the headlights used for searching lighting function and that relates to a location of a search zone relative to the origin point (O) of the frame of reference (R), the main control member being in communication with said identification means to which it transmits the lighting command.

12. Lighting equipment according to claim 11, wherein the main control member is arranged as a hinged stick movable in multiple directions and fitted with at least a focusing control member, a lighting sweep control member, a convergence control member, a zone control member, and the multiple-choice control member.

13. Lighting equipment according to claim 9, wherein the drive means individually fitted to each of the headlights comprise:
the housing, being fitted with turning drive means for turning about a turning axis (AR) corresponding to a first direction of movement of the headlight; and
a support for the headlight, the support being fitted with pivot drive means for pivoting relative to the housing about a pivot axis (AP) intersecting the turn axis (AR) and corresponding to a second direction of movement of the headlights.

14. Lighting equipment according to claim 13, wherein in the drive means for pivoting the support constitute means for retracting the headlight inside the housing, which housing is arranged as a container for housing the support.

15. A method of operating lighting equipment according to claim 9, wherein the method comprises:
an initial step of issuing a said lighting function command to the control means on the basis of an operator operating a said lighting function control;
a step of the control means selectively activating a light source of at least one of the headlights operated for the lighting function selected on the basis of the lighting function control; and
where appropriate, if the selected lighting function is a searching lighting function, a step of the identification means identifying a said search zone on the basis of the operator operating the main control member issuing a lighting command, and a step of individually driving the headlights having their respective light sources activated, so as to cause the light beams that they emit respectively to converge on the previously-identified search zone.

16. A method according to claim 14, including at least one control step derived from the operator operating a corresponding control member, selected from control steps generating control orders comprising focusing orders, lighting sweep orders, convergence orders, and zone orders.

17. A method according to claim 16, wherein for the control step comprising generating convergence orders, the individual drives of the headlights used for searching lighting function under the control of the coordination means cause the projections of the respective light beams emitted by a group of headlights having their respective light sources activated by the coordination means to converge on at least one search zone in any one of the following overlap patterns for said projections:

total overlap of all of the projections;
partial overlap between at least two projections; and
a plurality of partial overlaps between at least three projections.

18. The rotorcraft of claim 1, wherein the at least two headlights from the group of headlights include a headlight from the landing lighting device and a headlight from the winching lighting device.

19. The rotorcraft of claim 1, wherein the at least two headlights from the group of headlights include two headlights from the landing lighting device or two headlights from the winching lighting device.

20. A rotorcraft including lighting equipment comprising:
a landing lighting device including a first headlight mounted to the rotorcraft and a first associated drive system configured to pivot the first headlight relative to the rotorcraft, the landing lighting device being configured to illuminate a landing zone during a rotorcraft approach flight phase;
a winching lighting device including a second headlight mounted to the rotorcraft and a second associated drive system configured to pivot the second headlight relative to the rotorcraft, the winching lighting device being configured to illuminate a winching zone; and
a controller configured to, in response to a searching lighting request, control the first and second drive systems according to a searching lighting function to pivot the first and second headlights to cooperatively illuminate a zone remote from the rotorcraft.

* * * * *